United States Patent Office 3,477,982
Patented Nov. 11, 1969

3,477,982
PROCESS FOR FLAME PROOFING POLYEPOXIDE AND RESULTING PRODUCTS
Tette J. Dijkstra, Delft, Netherlands, and Edward J. W. Vogelzang, Esher, Surrey, England, assignors to Shell Oil Company, New York, N.Y., a corporation of Delaware
No Drawing. Filed Apr. 14, 1967, Ser. No. 630,833
Claims priority, application Great Britain, Jan. 13, 1967, 1,967/67
Int. Cl. C09k 3/28; C08g 45/00, 51/56
U.S. Cl. 260—37                                 16 Claims

ABSTRACT OF THE DISCLOSURE

A process for rendering polyepoxide flame proof by the addition of finely divided red phosphorous is disclosed. Lists of polyepoxides that can be used and methods for incorporating the red phosphorous are set out. Curing of the polyepoxide red phosphorous compositions with conventional curing agents and the use of the said compositions for making castings, molded articles, coatings and glass fiber laminates are also discussed.

DESCRIPTION OF THE INVENTION

This invention relates to a process for imparting flame proofing properties to polyepoxides and to the use of the resulting compositions in the preparation of self-extinguishing and non-burning molded articles, laminates, impregnating agents and coatings.

Specifically, the invention provides a new and highly efficient process for rendering polyepoxides, and preferably glycidyl polyethers of polyhydric phenols self-extinguishing and non-burning. The process comprises mixing with the polyepoxide finely divided red phosphorous, preferably in an amount varying from 2 to 25 parts by weight per 100 parts by weight of polyepoxide. The invention further provides the new compositions resulting from this process which are ideally suited for use in preparing castings, molded articles, coatings and laminated products which are flame proof.

There is a growing interest in the plastic processing industry for self-extinguishing and non-burning resinous materials, for example, for surface coatings, castings, molded articles, and in particular for laminates for use in electrical equipment. The excellent physical, chemical and electrical properties of cured polyepoxide have ensured them a firm stand in a large variety of applications. However, the usual polyepoxides are, as most organic materials, flammable. Therefore, many attempts have been made to improve the flame retardancy of this class of resins. One of the most widely investigated field of research to improve the flame retardancy of polyepoxides has been the incorporation of chlorine- or bromine-containing resin components, for example, a halogenated curing agent, or a halogenated polyepoxide. However, such halogenated resins have mostly decreased thermal stability in the range of 200–250° C., and further decreased softening temperature and mechanical properties as compared with the non-halogenated resins.

It has now been found that flame retardancy can be attained by the use of the process of the invention which comprises mixing with the polyepoxide having an average more than one epoxy group per molecule, finely divided red phosphorous, preferably in an amount of from 2 to 25 parts by weight per 100 parts by weight of polyepoxide. Excellent flame retardancy can be attained by using from 4 to 25, preferably from 6 to 25 parts by weight of finely divided red phosphorous per 100 parts by weight of polyepoxide. It was further found that thermal and electrical properties of the cured products were not affected by the incorporation of finely divided red phosphorous.

The finely divided red phosphorous is preferably used in stabilized form; an effective stabilizer is magnesium oxide, which can, for example, be precipitated onto the red phosphorous.

The red phosphorous to be used in the compositions of the invention is preferably a finely grounded grade, for example, a grade wherein at least 90% by weight and preferably about 98% by weight of the red phosphorous passes a 200 USA standard mesh sieve. Such a grade may have an average particle size, of say, 6 microns. A composition in which the red phosphorous has a particle size of up to 6 microns can be prepared by ball milling a composition comprising a polyepoxide and a red phosphorous of particle size as described hereinbefore, for example, during from 12 to 40 hours.

The polyepoxides to be used in the present invention are compounds having an average more than 1 epoxy group, i.e., a

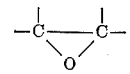

group, per molecule. The number of epoxy groups contained in the average molecule is obtained by dividing the average molecular weight of the polyepoxide by the epoxy equivalent weight. The polyepoxides may be saturated or unsaturated, aliphatic, aromatic or heterocyclic and may contain substituents such as halogen atoms, hydroxy groups and ether groups; they may be monomeric or polymeric.

Preferred polyepoxides are glycidyl polyethers of polyhydric phenols such as novolacs, resols, resorcinol, 4,4′-dihydroxy diphenyl sulfone, and diphenylol alkanes, preferably 2,2-bis(4-hydroxyphenyl)propane. Glycidyl polyethers of polyhydric phenols can generally be prepared by reaction of epichlorohydrin with the polyhydric phenol in the presence of an alkali hydroxide. Molecular weight, epoxy equivalent, weight, softening point, and viscosity of the polyepoxide depend in general on the ratio of epichlorohydrin to polyhydric phenol.

Preferred glycidyl polyethers are glycidyl polyethers of 2,2-bis(4-hydroxyphenyl)propane having an epoxy equivalent weight of from 170 to 300; these glycidyl polyethers are usually viscous liquids to semi-solids at 25° C. The viscosity of such glycidyl polyethers may be decreased by mixing with a minor proportion, i.e., from 5 to 20% by weight of a liquid monoepoxide, such as butyl glycidyl ether, phenyl glycidyl ether, stearyl glycidyl ether, or a glycidyl ester of a monocarboxylic acid, such as aliphatic monocarboxylic acids having 9 to 11 carbon atoms per molecule.

Other preferred glycidyl ethers are glycidyl polyethers of 2,2-bis(4-hydroxyphenyl)propane having an epoxy equivalent weight of from 300 to 700; such glycidyl polyethers are usually solids which have softening points above 25° C.

Other polyepoxides are polyglycidyl ethers of aliphatic polyhydroxy compounds, such as ethylene glycol, glycerol, trimethylol propane, and pentaerythritol; polyglycidyl esters of polycarboxylic acids such as phthalic acid, terephthalic acid, tetrahydrophthalic acid, hexahydrophthalic acid, and polymerized unsaturated fatty acids; and polyepoxides obtained by epoxidation of cyclohexene derivatives, such as the (3,4-epoxy 6-methylcyclohexyl)methyl ester of 3,4-epoxy 6-methylcyclohexane carboxylic acid. Mixtures of polyepoxides as described above or mixtures of polyepoxides and liquid monoepoxides can also be used.

The composition comprising a polyepoxide and finely divided red phosphorous can be converted to hard resinous materials by mixing and reacting with an epoxy resin curing agent. Suitable curing agents are polycarboxylic anhydrides, such as phthalic anhydride, tetrahydrophthalic anhydride, hexadrophthalic anhydride, pyromellitic dianhydride, endomethylene tetrahydrophthalic anhydride, methyl endomethylene tetrahydrophthalic anhydride, succinic anhydride, and alkyl or alkenyl succinic anhydrides such as dodecenyl succinic anhydride. The proportion of polycarboxylic anhydride to polyepoxide, expressed as the ratio of acid equivalency to epoxy equivalency, is generally between 0.8 and 2.3, preferably between 1.1 and 1.7, for example, when phthalic anhydride is used. Accelerators may be added such as tertiary amines, for example, benzyl dimethyl amine, 2,4,6-tris(dimethylaminomethyl)phenol, sulfides and mercaptans, organic phosphines such as triphenyl phosphine, salts of tertiary amines, quaternary ammonium salts, and imidazoles, for example, 2-ethyl 4-methylimidazole, benzimidazoles, and salts thereof. The accelerators are usually added in amounts of from 0.1 to 4 parts by weight per 100 parts by weight of epoxy compound.

Other useful curing agents are amino compounds having at least two amino hydrogen atoms per molecule. Examples are: aliphatic amines such as alkylene diamines, for example, ethylene diamine, diethylene triamine, triethylene tetramine, N-hydroxyethyl diethylene triamine; dicyandiamide; aromatic amines such as 4,4'-diamino diphenyl methane, 4,4'-diamino diphenyl sulfone, m-phenylene diamine and mixtures of those aromatic amines; adducts of aromatic polyamines with monoepoxides; cycloaliphatic amines such as bis(3-methyl 4-aminophenyl)methane and bis(4-aminocyclohexyl)methane; salts of amines and monocarboxylic acids such as the 2-ethyl hexoic salt of 2,4,6-tris(dimethylaminomethyl)phenol; heterocyclic amines such as N-aminoethyl piperazine, and imidazoles such as 2-ethyl 4-methyl imidazole, benzimidazole, N-alkyl imidazoles, N-alkyl benzimidazoles, and salts of those heterocyclic amines, such as acetate, lactate, and octoate; amides of polycarboxylic acids with an excess of an aliphatic amine, such as aminoamides derived from polymerized ethylenically unsaturated fatty acids and ethylene diamine or diethylene triamine; adducts of polyepoxides with an excess of aliphatic polyamines. Aliphatic, aromatic cycloaliphatic and heterocyclic polyamines and amino amides are generally used in amounts providing at least one amino hydrogen atom per epoxy group of the polyepoxide.

Other useful curing agents are boron trifluoride and adducts thereof with amines, alcohols and ethers.

The cure with amines and aminoamides as curing agents can be accelerated by accelerators such as phenols, salicylic acid and lactic acid, added generally in amounts of from 0.1 to 4 parts by weight per 100 parts by weight of epoxy compound.

Solvents, diluents, extenders, fillers, and pigments may also be added to the compositions of the invention. A particularly useful additive is a finely divided silica, such as commercially available under the trade names "Aerosil" and "Cab-O-sil," which can be used in amounts of from 1 to 5 parts by weight per 100 parts by weight of polyepoxide to assist in keeping the finely divided red phosphorous suspended.

The temperature and the reaction time for the cure depend on the choice of the polyepoxide and the curing component. The cure can be carried out in one or more stages, depending on the curing component and the envisaged application. With aliphatic polyamines cure may be effected at ambient temperature, e.g., 15–25° C., or at elevated temperature to accelerate the cure. With polycarboxylic anhydrides cure is usually effected at temperatures in the range of from 80 to 260° C., and with aromatic amines the curing temperature is usually chosen between 100 and 200° C. In compositions containing a curing agent the amount of finely divided red phosphorous is preferably chosen between 2.1 and 25, more preferably between 4 and 15 parts by weight per 100 parts by weight of polyepoxide and curing agent (or partially or wholly cured reaction product thereof).

The compositions of the invention comprising a curing agent can be used for making flame retardant, self-extinguishing or non-burning resinous articles by casting or molding and allowing to cure. They can also be used for coating a surface, e.g., the surface of a glass fiber laminate, a casting, or a molded article with a self-extinguishing or non-burning surface coating. They are preferably used for making glass fiber reinforced articles by impregnating glass fiber strands, mat or cloth and allowing to cure. Compositions containing finely divided red phosphorous in which the mixture of polyepoxide and curing agent is liquid may be applied to the glass fiber material by dipping, spraying or brushing and allowing to cure directly after the mass has been brought into the desired shape.

The impregnation provides a fibrous material comprising glass fiber strands, mat or cloth and a composition of polyepoxide, curing agent and finely divided red phosphorous. This fibrous material may be brought into shape and cured directly afterwards. In cases where a latent curing agent is used, that is a curing agent which provides full cure only at elevated temperature, the resin components in the fibrous material may be partially cured. Such a partially cured resin is called a "B-stage resin"; the resinous material therein is still soluble in solvents and fusible. Such a fibrous material may be stored for some time before the eventual laminate is made by bringing at least one such fibrous material in the desired shape and curing at elevated temperature.

The glass fiber material may also be impregnated with a composition comprising a polyepoxide, a latent curing agent, finely divided red phosphorous and a volatile solvent for the polyepoxide and the curing agent, whereupon the solvent is evaporated; the resin components may then be allowed to cure partially. Impregnated glass fiber material prepared by this method may also be stored for some time. Suitable solvents are ketones, such as acetone, easily reduced to 6 microns (24 hours ball milling), and with aromatic solvents such as toluene.

Contrary to expectations the finely divided red phosphorous is not filtered out appreciably by the glass fiber material during impregnation. Apparently the pores of the glass fiber cloth or mats used currently for making laminates are wide enough to allow passage of most particles of the finely divided red phosphorous. If the use of glass cloth having pores of about 6 microns or less is intended, the red phosphorous can be readily brought in the desired extra fine form, e.g., by milling a mixture comprising solvent, polyepoxide, curing agent active at elevated temperature, and finely divided red phosphorous (for example a grade of which 98% by weight passes a 200 USA Standard mesh sieve and of which the average particle size is about 6 microns) in a ball mill during, for example, from 12 to 40 hours, such as during 24 hours or 40 hours. In this way the maximum particle size can be easily reduced to 6 microns (24 hours ball milling), and even to 2 microns (40 hours ball milling).

There is also no danger of sagging out of the red phosphorous during impregnation, as the movement of the composition necessary for the impregnation provides sufficient stirring to keep the red phosphorous in suspension. For example, in filament winding glass rovings are usually drawn at large speed through a tray containing the impregnation mixture. Any dead corners of the tray in which the red phosphorous might sag out, would also cause gelation of the polyepoxide-curing agent mixture, and are for the latter reason alone already to be avoided by special construction of the tray.

Castings, molded articles, and laminates, containing a cured resinous material from compositions of polyepoxides, curing agents, and finely divided red phosphorous according to the invention, can be used for electrical equipment, for example, in complicated electronic machines such as computers, where the tendency to crowd more and more connections per unit of surface area entails the risk of overloading and eventually self-ignition, so that exclusively non-burning components can be allowed for.

The well-known high strength of a glass fiber reinforced epoxy resin laminate combined with the flame-retardant properties which red phosphorous provides to such a laminate may lead to unexpected uses. For example, the earth dike surrounding a large storage tank with flammable liquid such as petrol to avoid running to waste of the petrol in case of a leak in the tank or a fire can be made much thinner (and therefore cheaper to install) at the same strength if the inner side of the dike can be coated with a glass fiber reinforced epoxy resin laminate. This, on the other hand, is only possible if a cheap flame-retardant epoxy resin composition can be used, and here the use of red phosphorous may be the solution of the problem.

The invention is illustrated by some examples. Parts therein are parts by weight. The flame-retardant properties were determined according to ASTM-Method D 635–63.

The tracking resistance (determined according to VDE 0303) is the resistance of an insulating material against formation of a track on the surface for electrical currents by thermal degradation of the material under influence of a surface current. In the standard method used in the examples 2 electrodes, 4 mm. apart, are placed onto the surface, and an alternating potential of 380 v. is applied. An aqueous solution of $NH_4Cl$ and a surface-active agent is dropped onto the surface between the electrodes at a rate of 1 drop per 30 seconds. The number of drops required to cause a short circuit is recorded: if this number is between 1 and 10 the tracking resistance is designated as KA 1; if this number is between 11 and 100 the resistance is designated as KA 2; if after 100 drops no short circuit occurs the resistance is KA 3; the test is then stopped, and the depth of the groove caused by degradation of the surface is measured: KA 3a means that the groove is deeper than 2 mm., KA 3b means that the maximum depth of the groove is between 1 and 2 mm., and KA 3c means that the maximum depth of the groove is less than 1 mm. KA 3c is the highest degree of tracking resistance which can be determined by this method.

The polyepoxide used in the examples and designated as "Polyether A" was a commercially available liquid glycidyl polyether of 2,2-bis(4-hydroxyphenyl)propane having an average molecular weight of 370 and an epoxy equivalent weight between 182 and 194.

Polyepoxide B is a mixture of 85% by weight of Polyether A and 15% by weight of a mixture of glycidyl esters of aliphatic monocarboxylic acids having from 9 to 11 carbon atoms, in which the carboxyl group is attached to tertiary or quaternary carbon atoms; polyepoxide B has viscosity of 12–18 poises at 25° C., and an epoxy equivalent weight between 185 and 205.

"Polyether D" was a solid glycidyl polyether of 2,2-bis(4-hydroxyphenyl)propane having a softening point (determined according to Durrans' mercury method) between 64 and 74° C., and an epoxy equivalent weight between 450 and 500.

Further abbreviations and methods used in the examples are explained and listed below:

DDM=4,4'-diamino-diphenyl methane.
P=Finely divided red phosphorous, stabilized with about 0.3% by weight MgO.
Sieve analysis:
  Residue on sieve with openings of—

|  | Percent by weight |
|---|---|
| 0.4 mm | 0.0 |
| 0.15 mm | 0.1 |
| 0.10 mm | 0.7 |
| 0.075 mm | 1.2 |

Remaining 98% by weight passes a 200 USA standard mesh sieve and has an average particle size of 6 microns; the smallest particles are 0.5 micron.

HPA=hexahydrophthalic anhydride.
M=2-ethyl 4-methylimidazole.
Dicy=dicyandiamide.
BDMA=benzyldimethylamine.
MNA=methyl endomethylene hexahydrophthalic anhydride.
VST=Vicat softening temperature.[1]
ASTM Method D 150–54 T:
  [1] British Standard Method 2782–102 D.
  Dielectric constant ($\epsilon$)
  Loss factor (tg $\delta$)

Example I

Compositions listed in Table I were prepared by thoroughly mixing the polyepoxide, the curing agent, and other components where indicated at 25–35° C. Castings of these mixtures were cured for 1 hour at 100° C. and subsequently for 4 hours at 150° C.; the dimensions of the castings were 12.5 x 1.25 x 0.61 cm.

The systems are numbered from 1 to 6, and these numbers are used as a reference in Tables II to IV where results for thermostability and electrical properties, respectively, of the castings are given.

TABLE I.—SYSTEMS INVESTIGATED IN EXAMPLE I AND THERMAL PROPERTIES OF THE CASTINGS

| System | | | | | Time to Extinction (ASTM D 635–63) | | | |
|---|---|---|---|---|---|---|---|---|
| | | | | | | After Exposure for— | | |
| No. | Composition | Weight Ratio | P (wt. percent) | VST (° C.) | | 4 Hours at 150° C. | 1 Week at 150° C. | 4 Hours at 232° C. |
| 1 | Polyether A/DDM | 100/27 | | 161 | 40 sec | | | |
| 2 | Polyether A/DDM/Aerosil | 100/27/2 | | 160 | 40 sec | | | |
| 3 | Polyether A/DDM/Aerosil/P | 100/27/2/10 | 7.2 | 161 | 1 sec | 1 sec | 7 sec | 2 sec |
| 4 | Polyether A/HPA/M | 100/80/1 | | 135 | 9½ min | | | |
| 5 | Polyether A/HPA/M/Aerosil | 100/80/1/2 | | 136 | 9½ min | | | |
| 6 | Polyether A/HPA/M/Aerosil/P | 100/80/1/2/20 | 9.8 | 135 | 2 sec | 2 sec | 2 sec | 2 sec |

It can be seen from Table I that red phosphorous provides an excellent flame retardancy to the cured polyepoxide castings, and that this flame retardancy remains essentially the same after exposure of the castings to high temperatures.

Table II shows that the thermostability of the phosphorous-containing castings (Nos. 3 and 6) is essentially the same as those without phosphorous.

TABLE II.—WEIGHT LOSS OF THE CASTINGS OF TABLE I IN PERCENT AFTER EXPOSURE AT HIGH TEMPERATURES

| | Weight Loss (percent by wt.) After Exposure for— | | |
|---|---|---|---|
| System No. | 4 Hours at 150° C. | 1 Week at 150° C. | 4 Hours at 232° C. |
| 1 | 0.2 | 0.6 | 0.9 |
| 2 | 0.2 | 0.5 | 0.8 |
| 3 | 0.3 | 9.6 | 9.7 |
| 4 | 0.2 | 0.4 | 0.7 |
| 5 | 0.1 | 0.4 | 0.7 |
| 6 | 0.1 | 0.4 | 0.6 |

TABLE III.—SURFACE LEAKAGE, SURFACE AND VOLUME RESISTIVITY OF THE CASTINGS OF TABLE I

| System No. | Surface Leakage VDE 0303 | Surface Resistivity, (Ohm) | | Volume Resistivity, (Ohm/cm.) | |
|---|---|---|---|---|---|
| | | At 20° C. | At 50° C. | At 20° C. | At 50° C. |
| 1 | KA 3b | $7.5 \times 10^{14}$ | $3.4 \times 10^{14}$ | $1.8 \times 10^{15}$ | $1.8 \times 10^{15}$ |
| 2 | KA 3b | $7.5 \times 10^{14}$ | $2.6 \times 10^{14}$ | $1.3 \times 10^{15}$ | $1.4 \times 10^{15}$ |
| 3 | KA 3b | $7.5 \times 10^{14}$ | $3.8 \times 10^{14}$ | $1.6 \times 10^{15}$ | $1.7 \times 10^{15}$ |
| 4 | KA 3c | $8.0 \times 10^{14}$ | $4.9 \times 10^{14}$ | $1.5 \times 10^{15}$ | $1.7 \times 10^{15}$ |
| 5 | KA 3c | $4.9 \times 10^{14}$ | $4.1 \times 10^{14}$ | $1.9 \times 10^{15}$ | $1.8 \times 10^{15}$ |
| 6 | KA 3c | $8.0 \times 10^{14}$ | $7.5 \times 10^{14}$ | $0.9 \times 10^{15}$ | $1.2 \times 10^{15}$ |

TABLE IV.—DIELECTRIC CONSTANT AND LOSS FACTOR OF THE CASTINGS OF TABLE I

| System No. | Dielectric Constant | | | | | | $Tg\, \delta \times 10^{-4}$ | | | | | |
|---|---|---|---|---|---|---|---|---|---|---|---|---|
| | At 20° C. | | | At 50° C. | | | At 20° C. | | | At 50° C. | | |
| | 50 c./s. | $10^3$ c./s. | $10^6$ c./s. | 50 c./s. | $10^3$ c./s. | $10^6$ c./s. | 50 c./s. | $10^3$ c./s. | $10^6$ c./s. | 50 c./s. | $10^3$ c./s. | $10^6$ c./s. |
| 1 | 4.3 | 4.3 | 3.7 | 4.4 | 4.4 | 3.9 | 26 | 166 | 343 | 11 | 69 | 379 |
| 2 | 4.4 | 4.3 | 3.7 | 4.4 | 4.4 | 3.9 | 43 | 156 | 342 | 7 | 65 | 376 |
| 3 | 4.4 | 4.3 | 3.8 | 4.4 | 4.4 | 4.0 | 32 | 154 | 322 | 23 | 68 | 352 |
| 4 | 3.3 | 3.2 | 3.0 | 3.3 | 3.3 | 3.0 | 34 | 141 | 145 | 16 | 88 | 147 |
| 5 | 3.3 | 3.2 | 3.0 | 3.3 | 3.3 | 3.0 | 23 | 145 | 136 | 29 | 194 | 147 |
| 6 | 3.4 | 3.3 | 3.1 | 3.4 | 3.4 | 3.1 | 21 | 138 | 129 | 39 | 99 | 138 |

It can be concluded from Table III and IV that incorporation of red phosphorous (Nos. 3 and 6) has practically no influence on the electrical properties of the epoxy resin systems investigated.

Example II

Castings were prepared from composition listed in Table V by the method described in Example I, with the exception that the systems Nos. 3 and 4 which contain MNA had the following cure schedule: 1 hour/100° C.+17 hours/150° C.+15 hours/220° C. Values for the tracking resistance of the cured castings are given in Table V; electrical properties are tabulated in Table VI.

TABLE V.—SYSTEMS INVESTIGATED IN EXAMPLE II AND TRACKING RESISTANCE OF THE CASTINGS

| No. | System Composition | Wt. Ratio | P (Percent Weight) | Tracking Resistance |
|---|---|---|---|---|
| 1 | Polyepoxide B/HPA/BDMA | 100/80/1 | | KA 3c. |
| 2 | Polyepoxide B/HPA/BDMA/P | 100/80/1/20 | 10 | KA 3c. |
| 3 | Polyether A/MNA/BDMA | 100/90/1 | | KA 1. |
| 4 | Polyether A/MNA/BDMA/P | 100/90/1/20 | 9.5 | KA 1. |

TABLE VI.—DIELECTRIC CONSTANT AND LOSS FACTOR OF CASTINGS OF TABLE V

| System No. | Dielectric Constant | | | | | | | |
|---|---|---|---|---|---|---|---|---|
| | At 20° C. | | At 50° C. | | At 100° C. | | At 150° C. | |
| | $10^3$ c./s. | $10^6$ c./s. | $10^3$ c./s. | $10^6$ c./s. | $10^3$ c./s. | $10^6$ c./s. | $10^3$ c./s. | $10^6$ c./s. |
| 1 | 4.6 | 4.4 | 4.8 | 4.6 | 5.0 | 4.8 | 6.5 | 5.2 |
| 2 | 4.5 | 4.4 | 4.8 | 4.7 | 5.1 | 4.8 | 6.5 | 5.3 |
| 3 | 5.1 | 4.7 | | | | | 6.2 | |
| 4 | 5.1 | 4.8 | | | | | 6.3 | |
| Loss Factor $\times 10^{-4}$ at same temperatures and same cycles/second | | | | | | | | |
| 1 | 90 | 130 | 60 | 100 | 105 | 105 | 720 | 370 |
| 2 | 78 | 115 | 72 | 113 | 112 | 95 | 695 | 363 |
| 3 | 60 | 240 | | | | | 530 | |
| 4 | | | | | | | | |

Example III

Castings containing finely divided red phosphorous were compared with castings prepared from systems containing halogenated compounds as flame-retardant agents. The cure schedule for all systems was 1 hour/100° C.+4 hours/150° C. Systems and properties of the castings are shown in Table VII.

TCPL is beta-trichloromethyl-beta-propiolactone.

DER 542 is the diglycidyl ether of 2,2-bis(3,5-dibromo 4-hydroxyphenyl)-propane.

HET is 1,4,5,6,7,7-hexachloro-bicyclo(2.2.1) - 5 - heptene-2,3-dicarboxylic anhydride (chlorendic anhydride).

TABLE VII.—PROPERTIES OF FLAME-RETARDANT EPOXY RESIN CASTINGS OF EXAMPLE III

| Number | System Composition | Ratio (parts by Weight) | VST (° C.) | Halogen or P Content (percent by wt.) | Extinction Time | Weight Loss percent after 4 hrs. at 232° C. |
|---|---|---|---|---|---|---|
| 1 | Polyether A/DDM/TCPL | 100/32.3/10.1 | 153 | 4.0% Cl | 5 sec | 15.9 |
| 2 | Polyether A/HPA/M/TCPL | 100/80/1/20 | 116 | 5.6% Cl | 40 sec | 7.7 |
| 3 | Polyether A/HPA/HET/BDMA | 100/58/38/1 | 130 | 11.0% Cl | 1½ min | 1.5 |
| 4 | DER 542/DDM | 100/13 | 170 | 39.8% Br | 0 sec | (¹) |
| 5 | DER 542/HPA/M | 100/40/1 | 160 | 32.0% Br | 0 sec | 1.2 |
| 6 | Polyether A/DDM/Aerosil/P | 100/27/2/10 | 161 | 7.2% P | 1 sec | 0.7 |
| 7 | Polyether A/HPA/M/Aerosil/P | 100/80/1/2/20 | 135 | 9.8% P | 2 sec | 0.6 |

¹ Casting completely carbonized.

It can be seen from Table VII that castings containing red phosphorous (Nos. 6 and 7) have a shorter extinction time than castings containing comparable amounts of chlorine, and further that the thermal stability is superior to that of the halogen containing systems investigated.

Example IV

This example shows the excellent flame retardancy obtained with red phosphorous in glass fiber laminates.

Glass cloth was impregnated with molten mixtures of polyepoxides and curing agents, which in the systems Nos. 2 and 4 contained red phosphorous; several layers of impregnated glass cloth were superposed, squeezed out to remove excess of impregnating agent, and molded in a press for 1 hour at 100° C. followed by 4 hours at 150° C. to provide laminates 12.5 x 1.25 x 0.31 cm.

Compositions and extinction times of the laminates are tabulated in Table VIII.

TABLE VIII.—LAMINATES OF EAMPLE IV

| Number | System | | Percent by Weight Glass | Extinction Time |
|---|---|---|---|---|
| | Composition | Weight Ratio | | |
| 1 | Polyether A/DDM | 100/27 | 72 | 39 sec. |
| 2 | Polyether A/DDM/P | 100/27/10 | 73 | 2 sec. |
| 3 | Polyepoxide B/HPA/BDMA | 100/80/1 | 71 | 53 sec. |
| 4 | Polyepoxide B/HPA/BDMA/P | 100/80/1/20 | 70 | 3 sec. |

Table VIII shows that laminates containing red phosphorous (Nos. 2 and 4) had excellent flame retardancy.

Example V

Laminates were made from prepregs which contained various amounts of finely divided red phosphorous.

The resin system (consisting of Polyether D/Dicy/BDMA in weight ratio 100/4/0.2) was dissolved in a mixture of dimethyl formamide (20 parts by weight) and acetone (45 parts by weight). In this soltuion various amounts of finely divided red phosphorous were suspended as indicated in Table IX. Glass cloth was impregnated with these mixtures, the solvents were evaporated by drying at 130–140° C., and the dry prepregs were pressed for 1 hour at a temperature of 170° C. and a pressure of 3.5 to 14 kg./cm.$^2$. Laminates so prepared and having the dimensions 12.5 x 1.25 x 0.31 cm. had glass fiber contents and extinction times as shown in Table IX.

TABLE IX.—LAMINATES FROM PREPREGS OF EXAMPLE V

| System No. | P (wt. percent on resin composition) | P (wt. percent on polyepoxide) | Glass Fiber, percent by wt. | Extinction Time |
|---|---|---|---|---|
| 1 | | | 78 | 39 sec. |
| 2 | 4 | 4.2 | 73 | 11 sec. |
| 3 | 6 | 6.2 | 76 | 3.5 sec. |
| 4 | 8 | 8.3 | 73 | 3 sec. |
| 5 | 10 | 10.4 | 67 | 2.5 sec. |

According to NEMA-specifications for glass fabric based general purpose flame-resistant epoxy resin laminates type FR$_4$ and FR$_5$ the extinction time has to be less than 15 seconds. Table IX shows that laminates meeting this specification can be prepared by incorporating from 4 to 10% by weight red phosphorous on the weight of resin components, and that from 6% by weight red phosphorous a far better flame retardancy is achieved than those NEMA-specifications require.

We claim as our invention:
1. A polyepoxide composition capable of being cured for the preparation of self-extinguishing or non-burning molded articles, castings, laminates, impregnating agents or coatings, comprising a mixture of (1) a polyepoxide having an average more than one epoxy group per molecule, and (2) a flame retardant amount of finely divided red phosphorus.
2. A composition as claimed in claim 1, wherein the amount of red phosphorus is from 2 to 25 parts by weight per 100 parts by weight of polyepoxide.
3. A composition as claimed in claim 1 wherein the red phosphorus is used in stabilized form.
4. A composition as claimed in claim 3, wherein the red phosphorus is stabilized with magnesium oxide.
5. A composition as in claim 1 wherein at least 90% by weight of the red phosphorus passes at 200 U.S.A. standard mesh sieve.
6. A composition as in claim 1 wherein the red phosphorus has a particle size of up to 6 microns.
7. A composition as in claim 1 wherein the polyepoxide is a glycidyl polyether of a polyhydric phenol.
8. A composition as in claim 1 wherein the polyepoxide is a glycidyl polyether of 2,2 - bis( 4- hydroxyphenyl) propane having an epoxy equivalent weight of 170 to 700.
9. A composition as in claim 1 which also includes an epoxy resin curing agent.
10. A composition as in claim 9 wherein the curing agent is a polycarboxylic anhydride.
11. A composition as in claim 9 wherein the curing agent is an amino compound having at least two amino hydrogen atoms per molecule.
12. A composition as in claim 9 comprising from 2 to 25 parts by weight of finely divided red phosphorus per 100 parts by weight of polyepoxide and curing agent.
13. A process for preparing a composition as in claim 1 comprising milling red phosphorus with a polyepoxide in a ball mill.
14. A process for making a cured resinous article comprising heating the composition of claim 9 to effect cure.
15. A process for making a glass fiber reinforced article comprising impregnating glass fiber strands, mat or cloth with a composition as in claim 9 and heating to effect cure.
16. Glass fiber reinforced laminate comprising at least on the surfaces a composition as in claim 9 which is fully cured.

References Cited

FOREIGN PATENTS 1,173,641    7/1964    Germany.

MORRIS LIEBMAN, Primary Examiner

L. T. JACOBS, Assistant Examiner

U.S. Cl. X.R.

161—185; 260—45.7